United States Patent [19]

Watson

[11] 3,747,081

[45] July 17, 1973

[54] MAGNETIC DRUM HEAD MOUNT

[75] Inventor: James Power Watson, Palm Beach Gardens, Fla.

[73] Assignee: RCA Corporation, New York, N.Y.

[22] Filed: Nov. 26, 1971

[21] Appl. No.: 202,343

[30] Foreign Application Priority Data

Aug. 6, 1971 Great Britain .................. 37,099/71

[52] U.S. Cl. .... 340/174.1 C, 179/100.2 CA, 346/68
[51] Int. Cl. .............................................. G11b 5/54
[58] Field of Search .............. 340/174.1 C, 174.1 F, 340/174.1 E; 179/100.2 CA, 100.2 P; 346/68

[56] References Cited

UNITED STATES PATENTS

| | | | |
|---|---|---|---|
| 3,170,148 | 2/1965 | Steele | 340/174.1 C |
| 3,202,974 | 8/1965 | Bailitt | 340/174.1 E |
| 3,368,210 | 2/1968 | Zimmer | 340/174.1 E |
| 3,503,057 | 2/1970 | Logan | 340/174.1 C |
| 3,555,528 | 1/1971 | Stemme | 340/174.1 F |
| 2,986,607 | 5/1961 | Jacobs et al. | 340/174.1 F |
| 3,453,611 | 7/1969 | Laermer | 340/174.1 F |
| 3,308,450 | 3/1967 | Bourbon et al. | 340/174.1 E |
| 3,039,102 | 6/1962 | Fuller et al. | 179/100.2 CA |

*Primary Examiner*—Vincent P. Canney
*Attorney*—H. Christoffersen

[57] ABSTRACT

A magnetic drum has a plurality of record-reproduce heads along its surface. A common shaft having pins at precisely spaced intervals serves both to hold the heads in registration and to lift them from the surface of the drum. The device is journaled in bearings which serve as doweling to position split-end plates of the drum housing assembly. The drum is removable to permit interchangeability.

12 Claims, 6 Drawing Figures

PATENTED JUL 17 1973 3,747,081

SHEET 1 OF 4

MAGNETIC DRUM HEAD MOUNT

BACKGROUND OF THE INVENTION

In magnetic data storage units there is a need for low-cost and yet low-maintenance devices. This is particularly true of voice response units such as used by telephone companies to play prerecorded messages in response to customer calls. Previous units which generally comprise a drum and a plurality of heads each reading a tack on the drum have required many adjustments to properly align the parts. This results in a high assembly cost and a high cost for field maintenance to make periodic readjustments. In addition, the drum is usually fixed in (i.e. not removable from) the unit. Therefore, when a large part of the information on a drum has to be changed, this must be done by re-recording on the machine, a costly proposition.

SUMMARY OF THE INVENTION

An easily demountable drum system. It includes a number of features such as the drum housing being formed in two parts and with depressions in the end walls in which the drum bearings seat providing alignment reference between the drum and end walls. The heads all may be lifted from the drum surface concurrently. Means are provided for self-aligning the head assemblies and for normally causing them to engage the drum surface. These and a number of other features are discussed in greater detail below.

DETAILED DESCRIPTION

Figure 1:
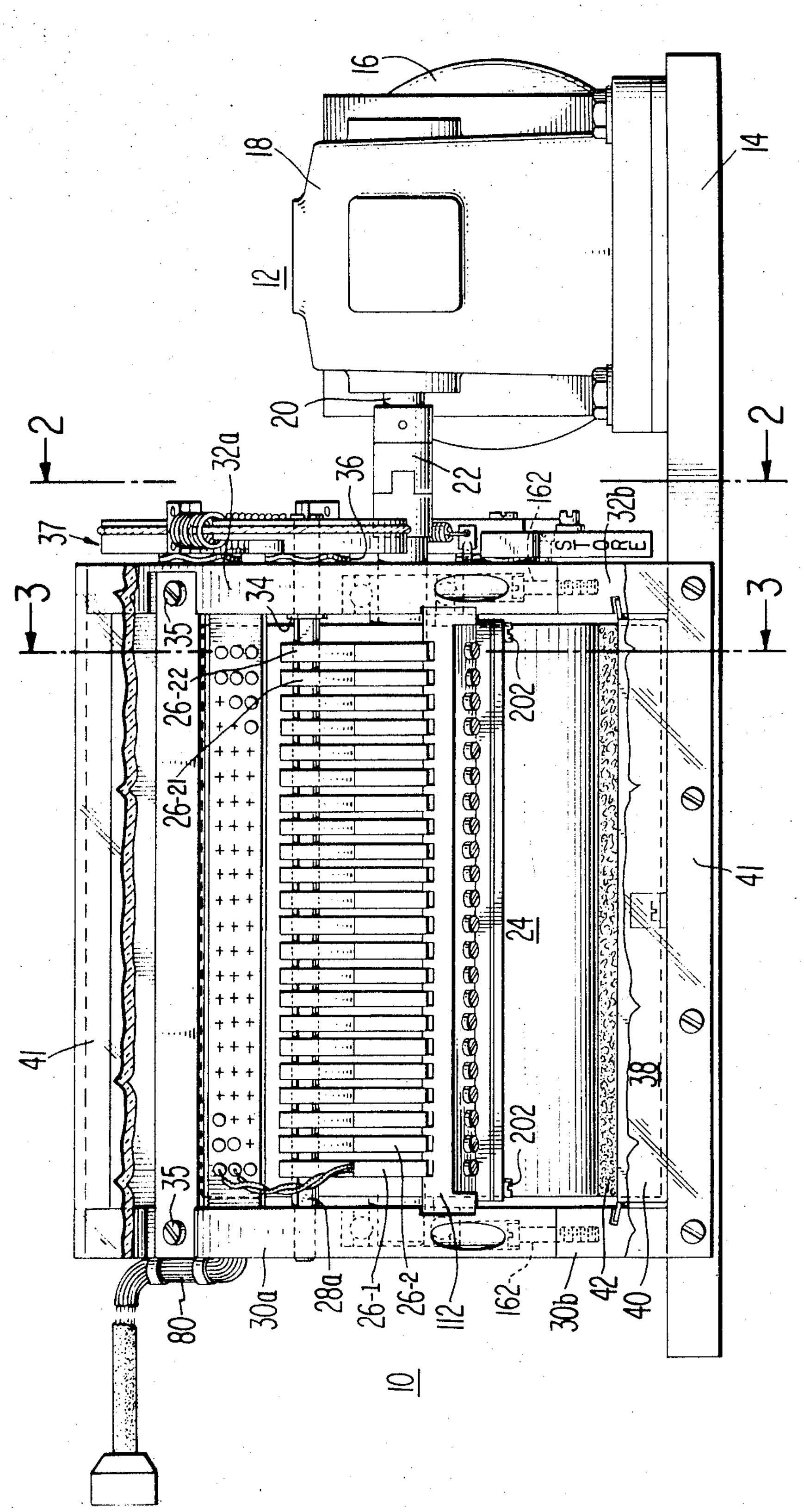
FIG. 1 is a drawing, partially in section of a magnetic data storage unit which includes the present invention.

In FIG. 1 a magnetic data drum assembly 10 and drive unit 12 are each attached to a common base plate 14. The drive unit may comprise any suitable driving means such as a motor 16 shown largely hidden behind gear reduction unit 18. Output shaft 20 of gear reduction unit 18 is coupled through a coupling 22 to drive a drum unit 24, only the lower portion of which is visible in FIG. 1.

The drum has on its surface a magnetic recording material on which data of either digital or analog type may be written along a plurality of tracks, each track extending circumferentially about the drum. For example, information may be recorded on 64 parallel tracks on drum unit 24.

Each track may have associated with it a record-reproduce head assembly. Twenty-two such head assemblies identified by the numeral 26 followed by a numeral to uniquely identify each head (i.e. 26-1 through 26-22) are illustrated. As will be seen in connection with other figures, there may be two other sets of 21 head assemblies numbered 26-23 through 26-43 and 26-44 through 26-64 spaced at other positions about the surface of the drum, thus bringing to 64 the total of such head assemblies. With such an arrangement, therefore, head assemblies 26-1 and 26-2 may be spaced a distance apart equal to three tracks. The other head assembly groups are then also spaced apart a distance equal to three tracks so they will fill in the spaces between heads 26-1 and 26-2, etc.

The 22 head assemblies 26 shown in FIG. 1 rest on a common shaft 28*a*. (There are also two other shafts 28*b* and 28*c*, one for each other group of head assemblies shown in FIG. 3.) Shaft 28*a*, which will be described in more detail later, acts, in conjunction with other elements to be described to accurately position the heads with respect to the drum 24. The shaft extends between side plates 30 and 32 (the side plates are split into upper and lower parts receiving the designations *a* and *b* respectively) and is held in precise registration relative to side plate 32, by means of C washer 34 to the left of the guide plate and spring washer 36 to the right of the guide plate. The spring washer acts to hold C washer 34 in contact against side plate 32 and therefore provide accurate registration of shaft 28*a* and heads 26 relative to the side plate.

Drum 24 is lubricated by a lubricating assembly 38 comprising a pan 40 filled with a suitable lubricant and a wick 42 which resides in pan 40 and has an end which is at all times in contact with the surface of drum 24. A cover 41 (shown broken away) covers the entire drum assembly 10 to prevent contaminants from being attracted to the drum 24.

An assembly generally labeled 37 is attached to the three shafts 28 *a*, *b* and *c* for the purpose of lifting heads 26 from the surface of drum 24. Assembly 37, shown in greater detail in FIG. 2, comprises three partial pulleys 50-1, 50-2 and 50-3, and the various components attached thereto. Each of the pulleys is attached to its shafts 28 *a*, *b* and *c* by a fastener 64 *a*, *b* or *c*, respectively. A cable 52 secured to pulley 50-1 by fastener 53 extends over pulleys 50-2 and 50-3 and terminates at a lever 54. The pulleys are also attached to one end of tension springs 56 *a*, *b* and *c* respectively. The other ends of the springs are attached to the side plate 32. Finally, the pulleys are attached to second tension springs 58, *a*, *b* and *c* respectively and these springs are secured at their other end to cable 52. Stop pins 60 *a*, *b* and *c*, attached to side plate 32, reside in slots 62 *a*, *b* and *c* respectively, in the different pulleys and thereby limit the travel of the pulleys.

Lever 54 (illustrated in its halfway point) pivots about screw 66 between two extreme positions. The first is when it has traveled counter-clockwise to a position such that pin 68 which is attached to plate 32 resides in slot 70 (shown in phantom). The second is when it has traveled clockwise to a position in which the pin 68 resides in slot 72 (shown in phantom). The length of cable 52 is designed such that when lever 54 is in its full counter-clockwise position, the cable is slack and all pulleys 50 are in their full counter-clockwise position limited by pins 60 *a*, *b* and *c*. The pulleys are moved to and held in this counter-clockwise position by springs 56 *a*, *b* and *c*. When lever 54 is rotated to its full clockwise position, tension is applied to cable 52. Since the cable passes over each of pulleys 50, it tends to rotate them in the clockwise directon. Springs 58 *a*, *b* and *c* attached to the pulleys take up any uneven tension from one pulley to another so that all pulleys are rotated to their full clockwise position.

Figure 3:
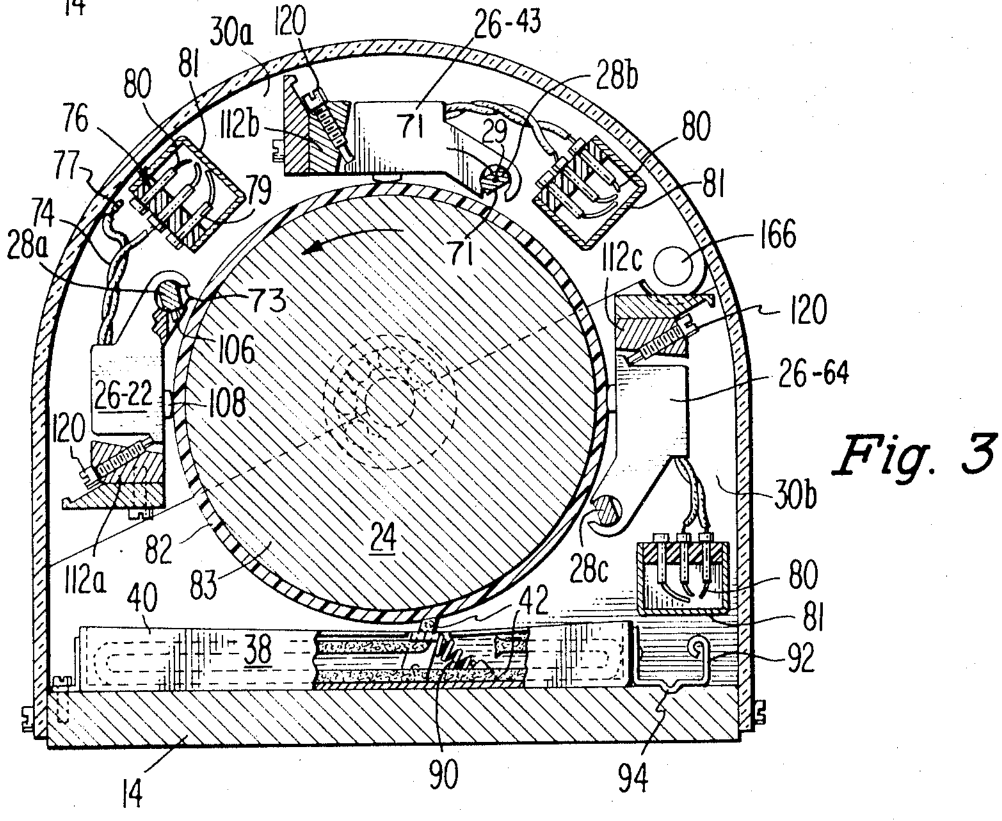
FIG. 3 is a cross-section taken along lines 3—3 of FIG. 1, and illustrates the head arrangement.

The purpose of the arrangement just described is to lift each of head assemblies 26 from contact with drum 24 as will better be seen in FIG. 3, to which the reader's attention is now directed. In FIG. 3 which is a cross-secton taken along lines 3-3 of FIG. 1, head assemblies are shown in greater detail. In FIG. 3 three head assemblies are shown numbered 26-22, 26-43 and 26-64 respectively. Each of the head assemblies shown is one of a plurality of head assemblies extending back (into the drawing) from the three head assemblies shown. Each of the head assemblies is attached to a shaft 28 which is made of centerless ground stock. Each shaft 28 has two parallel flat portions 71 ground on it. Flats 71 are spaced apart a distance less than the width of slot 73 in the head assemblies, thus permitting removal of the head assemblies in a manner to be described shortly.

A pair of wires 74 lead from each head assembly to pin and socket connectors 76 in a cable harness assembly 80. One pin 77 is removed from socket 79 to show the ease with which electrical connections are made. Cables 80 (there is one for each of the three head assemblies) exit from the left side (as illustrated in FIG. 1) of drum assembly 10. The cable assemblies reside in U-shaped cable channels 81 which extend between side plates 30 and 32 being attached thereto by fasteners 35 (see FIG. 1) to permit easy removal after all pins 77 have been removed from sockets 79. From the cable harness assembly 80, wires (not shown) lead to a switching assembly which in turn may be connected to any suitable load or amplifying means. The switching assembly is not shown. It may be of any conventional design and its purpose is to permit one of the heads at a time to be selectively coupled to the amplifying means (also not shown) or other load. A third unused socket 79 in assembly 80 may be coupled to a noise shield (not shown) which may be placed between adjacent head assemblies. This socket 79 may be grounded or connected to some other suitable noise suppressing circuitry.

Drum 24 shown in better detail in FIG. 3 comprises a soild metal cylinder 83 surrounded by a magnetic elastomer 82 on which the magnetic tracks of information are recorded.

Lubrication assembly 38 is also shown in greater detail than in FIG. 1 and in the section partially broken away shows a compression spring 90 urging the vertical portion (as illustrated) of felt wick 42 against the drum surface 82. Spring clip 92 serves as both a handle to remove tray 40 to which it is attached from the drum assembly and to hold the tray in the position shown by means of dimple 94 in base 14.

Figure 4:
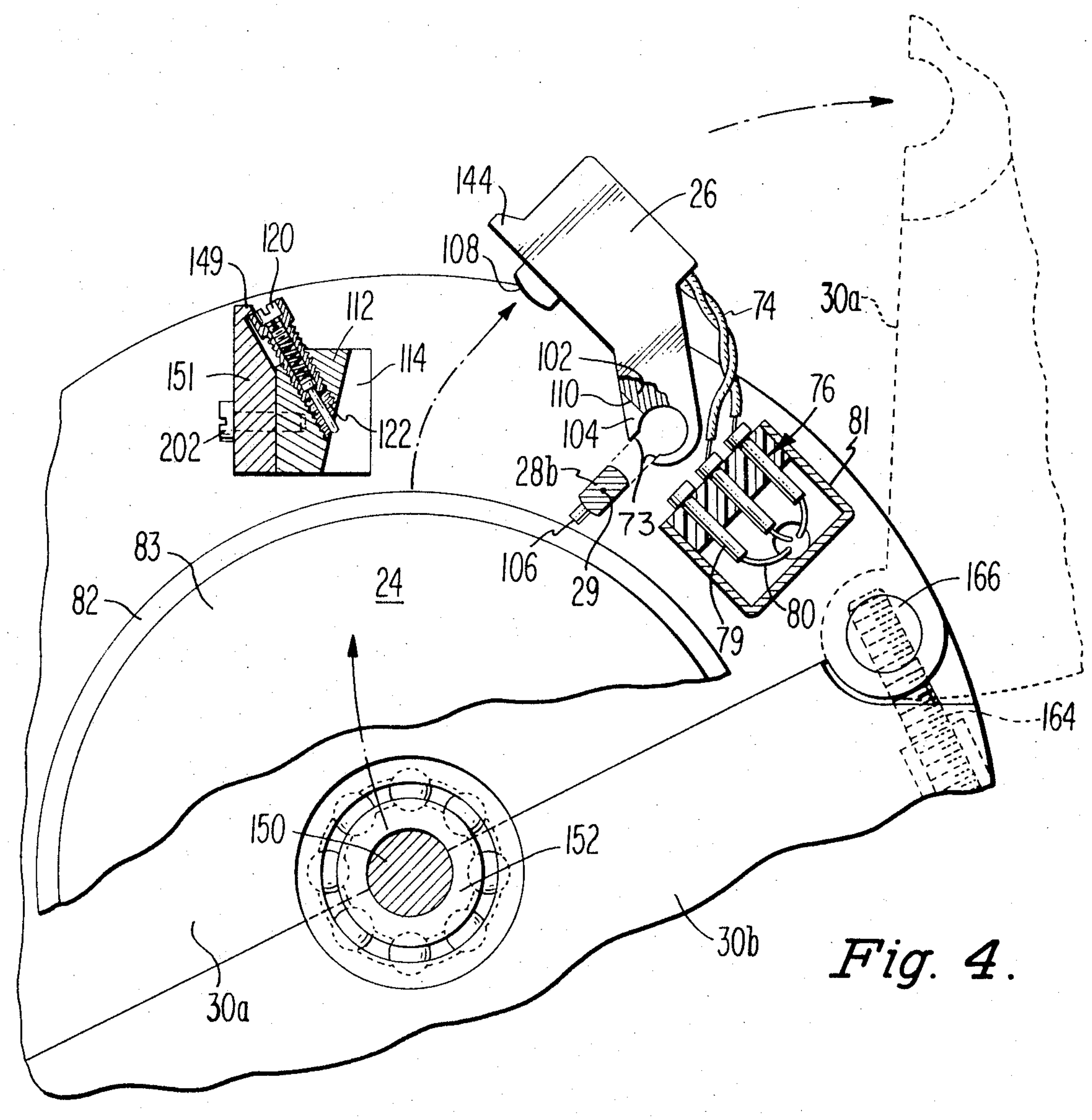
FIG. 4 is an enlargement of a portion of FIG. 3 showing the record-reproduce head assembly.

In FIG. 4 which illustrates one head assembly 26 in greater detail, the head is shown removed from bar 28*b*. A portion 102 of head 26 is broken away to show the earpiece 104. A similar piece 104 would be part of the area which is broken away. The two areas form a slot extending in a direction normal to the axis of shaft 28 which surrounds a projecting member such as a pin 106 in bar 28. There is one pin 106 for each of the 64 heads 26. Pin 106 serves to provide lateral positioning of this end of the head. Also when head 26 is in the position shown in FIG. 3 (i.e. so that the pole face portion 108 is in contact with drum 24) pin 106 may be used to raise the head 26 from the drum. This is done by the mechanism of FIG. 2 which by rotating the three shafts 28 rotates the pins 106 with them until the pins engage the walls 110 defining the closed ends of the slots formed by earpieces 104, and raise the heads. It is desirable to raise the heads 26 from the drum when the drum is not rotating to prevent "flat spots" on elastomer 82 caused by pole pieces 108 and to eliminate head-drum friction during drum startup.

The end 144 of each head 26 opposite the end containing slot 72 resides in a slot in slotted bar 112. There are three such bars 112 *a*, *b* and *c* respectively. The bars 112, one of which is best seen in FIG. 1, run the width of drum assembly 10, extending from side plate 30 to side plate 32 and contain a slot for each head 26. Bars 112 and plates 30 and 32 are rigidly secured together to form a portion of the frame. The slots extend in a direction normal to the axis of rotation of drum 24. Sidewall portions 114 (FIG. 4) of slotted bar 112 position heads 26 axially with respect to the drum and also ensure that pole face 108 is kept parallel with magnetic elastomer 82 on drum 24. Another important feature of the apparatus is that the rotational center 29 of each shaft 28 is tangent to drum surface 82 at the point of contact with pole face 108. With the shaft so located heads 26 are restrained against the frictional drag of drum surface 82 and there is no tendency for pole face 108 to either bounce off the drum surface or to dig in.

Figure 5:
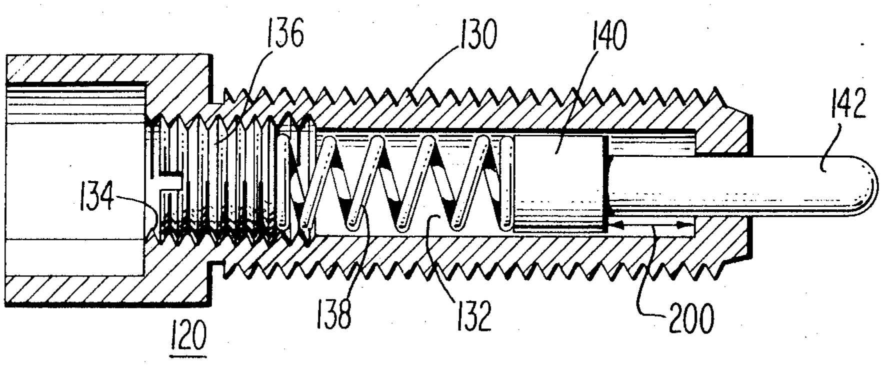
FIG. 5 is an enlarged view of a fastening means used to hold the head assembly of FIG. 4 in place.

Cartridge 120 (one for each of the 64 heads 26) residing in bore 122 of bar 112, holds head 26 in contact with drum 24 (FIG. 3). Cartridge 120 is seen in FIG. 5 to comprise an outer threaded portion 130 containing a bore 132. A portion 134 of bore 132 is threaded to receive an adjusting screw 136. A compression spring 138 also resides in the bore and extends from adjusting screw 136 to pin 140. The assembly as here shown is in normal operating position with spring 138 compressed to provide maximum allowable force on pin 142. Distance 200 is sufficient to compensate for machine tolerances and also allow for pole face wear-out without "bottoming" in casing bore 132.

The nose 142 of pin 140 is in contact with toe 144 of head 26 (see FIG. 4) and acts to urge the head against drum 24. Screw 136 is adjusted to provide the desired pressure to head 26 and is the only adjustment of significance on the entire drum unit. Spring 138 may be made of sufficient length so that essentially constant pressure is maintained even though pole face 108 of head 26 (see FIG. 4) wears. Therefore, no field adjustment of screw 136 is required and in fact in production the screw may be fixed so that it cannot be turned at the field sites. The pressure exerted by spring 138 is sufficiently light to allow the heads 26 to be raised off of the drum when the mechanism of FIG. 2 turns shafts 28 *a*, *b* and *c*.

Returning again to FIG. 4, cartridge 120 is shown removed from its normal position to permit removal of head 26. A ledge 149 at an end of member 151 prevents cartridge 120 from being removed completely from bar 112 and in this way prevents it from being misplaced or dropped onto moving drum 24. Member 151 is secured to bar 112 by screws 202 (one of two shown). Merely loosening these screws allows ledge portion 149 to be tipped back sufficiently to permit removal of any or all of cartridges 120 for adjustment or replacement.

Figure 6:
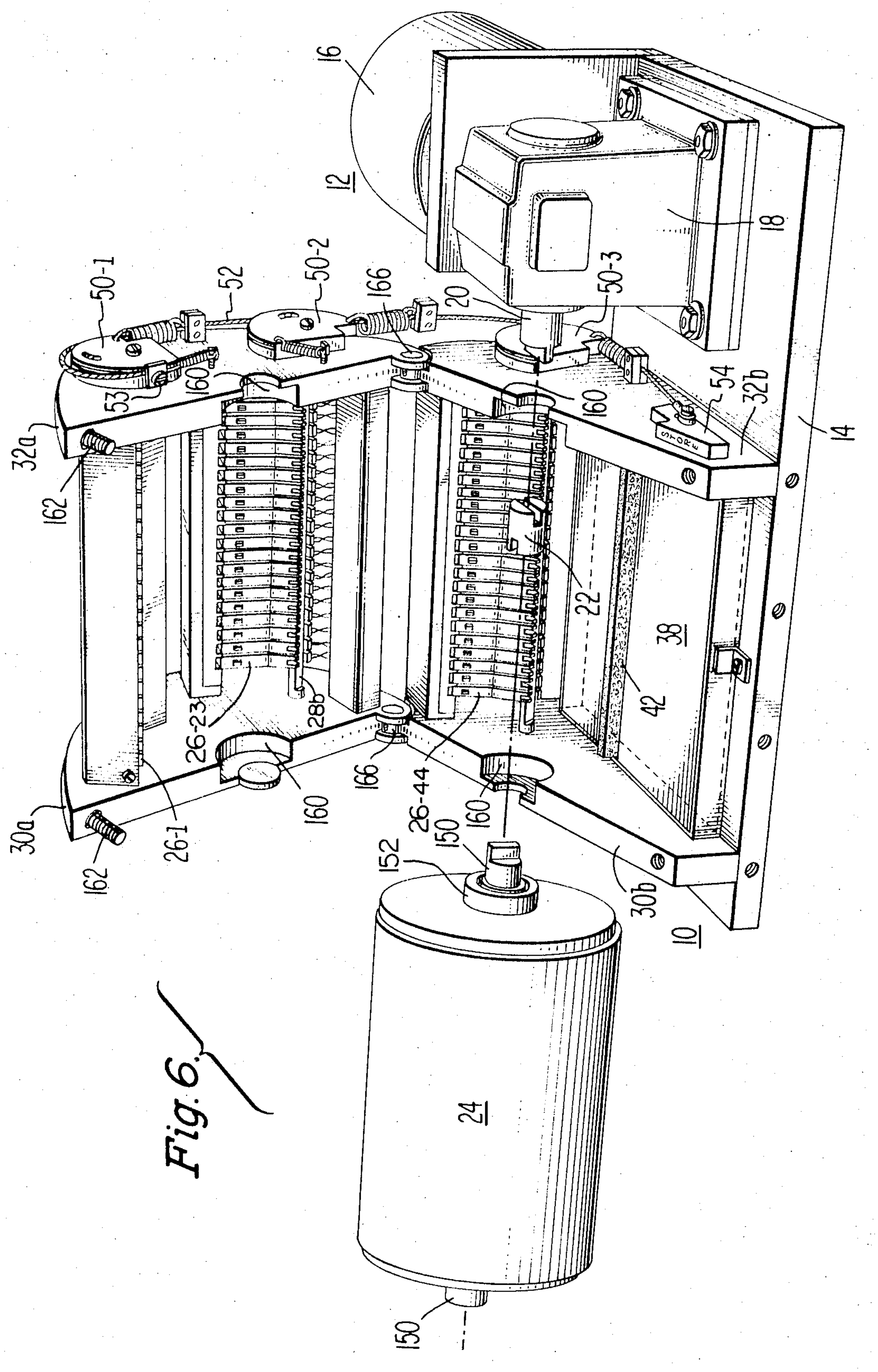
FIG. 6 is a view of the magnetic data storage unit in its open position with the data drum removed.

In FIG. 6 drum assembly 10 is illustrated in its open position with drum 24 removed. The drum 24 is removable to permit replacement for any reason such as if the drum becomes damaged or if it is desired to substitute a drum containing new information. Drum 24 rotates about a shaft 150 extending through the drum and protruding at both ends. On each end of shaft 150 is a bearing means such as an oilite or low-friction plastic, one-piece element or, as shown, a ball bearing 152, (ball bearing 152 on the left end of shaft 150 as illustrated in FIG. 6 is hidden by the drum). Ball bearings 152 in addition to providing the usual low-friction interface between shaft 150 and opposing side plates 30 and 32 also act as dowel members.

Figure 2:
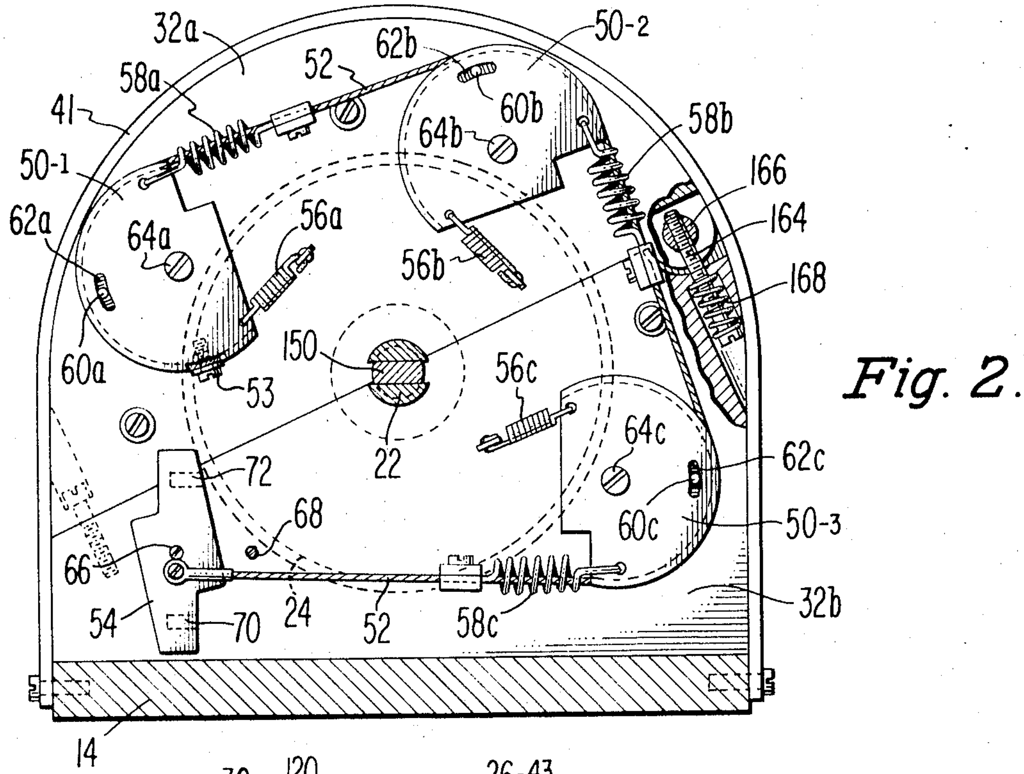
FIG. 2 is a cross-section taken along lines 2—2 of FIG. 1, and illustrates the head lifting mechanism.

The doweling works as follows. Bearings 152 reside in tight-fitting 160 in each of side plates 30 and 32. The roller bearings are the only means of aligning side plates 30*a* and 32*a* relative to side plates 30*b* and 32*b*. This is so because screws 162 which hold the upper side plates to the lower side plates reside in oversized openings in the upper side plates. Further, as best seen in FIG. 2, the hinging mechanism for the upper side plates includes a screw 164 (for each side plate) which holds in place pins 166 about which the upper side plates pivot. As seen in FIG. 2, the screw 164 is loosely fitted through bore in lower side plate to allow lateral movement between upper and lower side plates. It is heavily spring loaded to secure this end of the side plates in tight frictional relationship after they have been doweled into position by the bearings during closing. The other end of side plates are secured in similar relationship by screws 162. Therefore, the only method of positioning the upper side plates relative to the lower side plates is via ball bearings 152.

The final result is that the upper and lower side plates are positioned accurately relative to drum 24 and since the various head assemblies are positioned accurately relative to the side plates they are therefore automatically positioned accurately relative to the drum 24.

To summarize there has been described a drum memory assembly containing a number of unique features, perhaps the most important of which is that with the exception of one factory-set adjustment of spring pressure in cartridge 120, there is not a single adjusting device in the entire assembly. The result is inexpensive assembly cost and low field maintenance cost. Also since the drum end plates 30 and 32 are split, the drum 24 may be easily removed for replacement.

Heads replacement with no degradation of signal and no adjustments required (or provided) is made possible because of the precise alignment provided both ends of the head.

Accurate positioning of one end of heads 26 is assured. Since it is an easy matter to accurately position head aligning pins 106 along shaft 28, an inexpensive centerless ground stock, having tight tolerances, and since the end of each shaft 28 *a*, *b*, *c* is held solidly against end plate 32 by wavey washers 36. The other end of heads 26 are accurately positioned, because elements 112 containing a close tolerance slot for each head are also rigidly attached to end plates 30 and 32.

Accurate alignment is not achieved at the expense of easy head removal. Head removal is accomplished simply by loosening cartridge 120 against stop 149 positioned to prevent the screw being fully removed and therefore possibly lost. The head is then simply rotated about shaft 28 until slot 72 lines up with flat portions 70 on the shaft whereupon the head can easily be slipped off of the shaft as best seen in FIG. 4. Electrical disconnection of the head is easily accomplished by removing pins 76 from sockets 77 (FIG. 3).

Cable assembly 80 is easily removed from the apparatus (should this become necessary) by removing two screws 35 (FIG. 1) permitting the removal of cable channel 81 containing cable 80.

A head lifting mechanism 37 provides for the easy lifting of all 64 heads 26 from the surface 82 of drum 24 by the simple expedient of rotating lever 54 (FIG. 2). As the lever is rotated, shafts 28 and pins 106, which also serve to axially align the heads, are also rotated causing the heads to be lifted.

Finally a lubricating assembly 38 contains a felt wick 42 which ensures lubrication of drum 24 while metal container 40 containing the lubricant being slidably attached to side plates 30 and 32 cannot come in contact with drum 24 causing possible damage.

What is claimed is:

1. An elongated shaft, rotatable about its axis, having at each of a plurality of spaced points located axially of the shaft a projecting member;

means having a reference surface;

a plurality of elements engageable with said surface, mounted on and rotatable about said shaft, each element having a slot extending in a direction normal to the shaft axis in which a different one of said projecting members resides for axially positioning the element;

means for urging said elements against said reference surface; and means for rotating said shaft and said projecting members about the shaft axis, said projecting members thereby contacting an edge of the slotted portion of said elements to thereby raise said elements from said reference surface.

2. The combination as set forth in claim 1 wherein said means having a reference surface comprises a drum rotatable about its axis which is parallel to that of said shaft and wherein said surface consists of magnetic material on which may be recorded information.

3. The combination as set forth in claim 2 wherein said elements are transducer elements for recording on and reproducing from said drum surface.

4. The combination as set forth in claim 1 wherein said shaft comprises material having generally a cylindrical cross-section and having two oppositely located flat portions and wherein said elements include generally cylindrical openings in which said shaft resides, each of said cylindrical openings having a portion, slightly larger than the width of said shaft between said two flat portions, removed for permitting the removal from or insertion onto said shaft.

5. The combination as set forth in claim 1 wherein said means for urging said elements against said reference surface comprises a slotted member having a slot for each element said elements residing in said slots, a hollow member located in said slotted member in which resides a pin, a portion of which extends beyond the end of said hollow member and a resilient means coupled to said hollow member and urging said pin out of said hollow member into contact with said element to thereby urge it into contact with said reference surface.

6. In combination:

an elongated shaft rotatable about its axis having at each of a plurality of spaced points located axially of the shaft, a pin, said shaft being of generally cylindrical cross-section having two oppositely located flat portions;

a drum rotatable about its axis, which is parallel to that of said shaft, having a surface comprising magnetic material on which may be recorded information;

a plurality of transducer elements engageable with said drum surface and mounted on and rotatable about said shaft, each having a slot extending in the direction normal to the shaft axis in which a different one of said pins resides for axially positioning the element, said elements including generally cylindrical openings in which said shaft resides, each of said cylindrical openings having a portion, slightly larger than the width of said shaft between said two flat portions, removed for permitting the removal from and insertion onto said shaft;

means for urging said elements against said drum comprising a slotted member having a slot for each element, said elements residing in said slots, there being associated with each element a hollow member located in said slotted member in which resides a pin, a portion of which extends beyond the end of said hollow member, and a resilient means coupled to said hollow member and urging said pin out of said hollow member into contact with said element to thereby urge it into contact with said drum surface; and means for rotating said shaft and said pins located thereon about the shaft axis, said pins located on said shaft thereby contacting the bottom of the slotted portion of said elements to thereby raise said elements from said drum surface.

7. An arrangement for locating the head of a head assembly at a given position along the length of a magnetic drum comprising, in combination:

a head assembly formed with an aperture in one end portion thereof and including a head spaced a fixed distance from said aperture;

a rod passing through said aperture, said rod being located adjacent to the drum surface and parallel to the drum axis, said rod also being formed with alignment means engaged with said head assembly for maintaining said assembly at a given position along the length of said rod, and said head assembly being pivotable about said rod in a plane perpendicular thereto, with the head of said assembly facing said drum; and biasing means engaging an end portion of said assembly opposite said aperture and urging the head against the drum surface.

8. In a magnetic drum system, in combination:

a magnetic drum;

a plurality of heads normally engaged with the drum surface; and means coupled to all heads for concurrently lifting them from the drum surface comprising a plurality of shafts, each shaft coupled to a different group of head assemblies, each head assembly being provided with an aperture within which one of said shafts is located, each of said head assemblies being further provided with a slot communicative with said aperture, said shafts including a projecting element for each of said head assemblies which is locatable in said slot and movable in said slot when a shaft is in the aperture of a head assembly, the movement of said projecting element being stopped by a wall of said slot when the shaft is rotated through greater than a given angle.

9. An arrangement for mounting a plurality of magnetic head assemblies for a magnetic drum comprising, in combination:

a shaft adjacent to the drum surface and parallel to the drum axis;

a plurality of head assemblies, each assembly formed with an aperture at one end portion thereof and a slot opening on said aperture, said shaft passing through all apertures, each assembly extending in a direction substantially normal to said shaft;

a plurality of alignment pins on said shaft, each extending from the shaft and into a slot in a head assembly, each for maintaining an assembly at a given position along the length of the shaft; and biasing means engaged with said assemblies for pivoting each assembly about said shaft and into engagement with the drum surface.

10. An arrangement as set forth in claim 9, wherein each assembly includes a surface at the end portion thereof opposite the one end portion formed with the aperture, and wherein said biasing means includes, for each assembly, a pin spring biased into engagement with said surface of said assembly.

11. An arrangement as set forth in claim 10 wherein each slot is formed with a wall at the closed end thereof engageable by an alignment pin when the shaft and pin rotate through more than a given angle; and means for rotating said shaft through an angle sufficiently large to engage all alignment pins with the walls of the slots in which they are located and to raise the head assemblies from the drum surface in the process, the spring biased pins being forced to retract during said movement, by the moving head assemblies.

12. An arrangement as set forth in claim 9 wherein each aperture includes a circular portion and an opening of smaller dimension than the diameter of said circular portion for permitting the shaft to enter the aperture and the assembly to be removed from the shaft, and said shaft having two parallel flats spaced apart a distance less than the size of said opening and two other surfaces of circular cross-section and having a diameter of curvature smaller in size than said diameter of said aperture.

* * * * *